(12) United States Patent
Cui

(10) Patent No.: US 11,085,616 B1
(45) Date of Patent: Aug. 10, 2021

(54) EASY-TO-INSTALL INDUCTION CAMERA LAMP

(71) Applicant: Ningbo Fiercer Leopard Electrical Appliance Co., Ltd., Zhejiang (CN)

(72) Inventor: Jianqing Cui, Zhejiang (CN)

(73) Assignee: Ningbo Fiercer Leopard Electrical Appliance Co., Ltd., Ningbo (CN)

( * ) Notice: Subject to any disclaimer, the term of this patent is extended or adjusted under 35 U.S.C. 154(b) by 0 days.

(21) Appl. No.: 17/093,631

(22) Filed: Nov. 9, 2020

(30) Foreign Application Priority Data

Sep. 30, 2020 (CN) .......................... 202022217631.2

(51) Int. Cl.
*F21V 21/14* (2006.01)
*F21V 23/04* (2006.01)
*F21V 21/02* (2006.01)
*F21S 8/00* (2006.01)

(52) U.S. Cl.
CPC .............. *F21V 21/14* (2013.01); *F21S 8/036* (2013.01); *F21V 21/02* (2013.01); *F21V 23/0478* (2013.01)

(58) Field of Classification Search
None
See application file for complete search history.

(56) References Cited

U.S. PATENT DOCUMENTS

2017/0299164 A1* 10/2017 Mak ........................ F21S 8/033

* cited by examiner

*Primary Examiner* — Vip Patel

(57) ABSTRACT

Disclosed is an easy-to-install induction camera lamp which includes a bottom plate to be installed to a wall, and a middle plate with a lamp cap mounted thereon. The bottom plate is provided on a front side thereof with a plurality of slots, and the middle plate is provided on a rear side thereof with buckles corresponding to respective ones of the slots. The middle plate is detachably connected with the bottom plate through the buckles and the slots. The bottom plate is provided therein with a shift block connected with a locking piece. Driving of the shift block allows the locking piece to be moved and inserted into the slot to lock the buckle. A new structure is provided to simplify the installation of lamps.

10 Claims, 4 Drawing Sheets

EASY-TO-INSTALL INDUCTION CAMERA LAMP

CROSS REFERENCE TO RELATED APPLICATIONS

The present application claims the benefit of Chinese Patent Application No. 202022217631.2 filed on Sep. 30, 2020, the contents of which are incorporated herein by reference in their entirety.

FIELD OF THE INVENTION

The present invention relates to the field of lighting technology, in particular to an easy-to-install induction camera lamp.

BACKGROUND OF THE INVENTION

Induction lamps are a new type of intelligent lighting products that automatically control a light source to light up by means of an induction module. They are most advantageous in their automatic ON and OFF feature which brings great convenience to people's life. Induction lamps turn on when people come and turn off when people go, and are particularly suitable for use in areas such as underground garages, stairways, automated factories, warehouses, elevator entrances, hallways, balconies, etc., which require automatic ON and OFF lighting.

Currently in the field of induction lamps, the structure of a camera is combined with an induction lamp to form an induction camera lamp. This further expands functions of lamps, and solves problems with space and arrangement of multiple wires when multiple products are separately installed.

However, existing induction camera lamps have the problem that they are not easy to install. 1. An induction camera lamp usually adopts a lamp that can provide strong lighting, and in order to increase the range and angles of the lighting, the induction camera lamp is often provided with a plurality of adjustable lamp caps, as well as components such as inductive heads, cameras, etc. This results in a large weight and volume of the entire induction camera lamp, making it very inconvenient to install the induction camera lamp to the wall and even necessary for another worker to help to lift the induction camera lamp. 2. When installing an induction camera lamp, one needs to fully consider the inductive range and the camera angle of the induction camera lamp. However, in many restricted environments, there is no large-area wall suitable for the installation of the induction camera lamp.

SUMMARY OF THE INVENTION

The present invention aims to provide an easy-to-install induction camera lamp in which a new structure is provided to simplify the installation of lamps.

In order to achieve the above objective, the present invention adopts the following technical solutions. An easy-to-install induction camera lamp includes a bottom plate to be installed to a wall, and a middle plate with a lamp cap mounted thereon. The bottom plate is provided on a front side thereof with a plurality of slots, and the middle plate is provided on a rear side thereof with buckles corresponding to respective ones of the slots. The middle plate is detachably connected with the bottom plate through the buckles and the slots. The bottom plate is provided therein with a shift block connected with a locking piece. Driving of the shift block allows the locking piece to be moved and inserted into the slot to lock the buckle.

According to a preferred solution of the present invention, a strip-shaped mounting piece is provided behind the bottom plate, and the bottom plate is provided at a center thereof with a central shaft and an adjustment shaft and is provided on a rear side thereof with a semi-circular arc-shaped adjustment slot. The adjustment shaft is mounted in the adjustment slot and is rotatable about the central shaft. The mounting piece is connected with the bottom plate through the central shaft and the adjustment shaft.

According to a further preferred solution of the present invention, when the central shaft and the adjustment shaft are in a state of not locking the mounting piece, the mounting piece is rotatable by 180 degrees in response to a force applied thereon; and when the central shaft and the adjustment shaft are in a state of locking the mounting piece, the mounting piece is fixed to the bottom plate, and the bottom plate is to be fixed to the wall through the mounting piece.

According to a further another preferred solution of the present invention, the locking piece is provided thereon with a limit post; and an end of the shift block is provided with a limit hole sleeved outside the limit post, and another end of the shift block extends out of the bottom plate and is located on an outer circumference of the bottom plate. Driving of the another end of the shift block allows the locking piece to be driven to move into or out of the slot.

According to a further preferred solution of the present invention, the another end of the shift block is fixed to a side wall of the bottom plate by means of a screw.

According to a further another preferred solution of the present invention, the bottom plate is provided on the front side thereof with a plurality of arc-shaped slots, and the buckles are L-shaped sheet structures. After being embedded into the slot, the buckle is rotatable for a distance so that the locking piece can be inserted.

According to a further preferred solution of the present invention, the middle plate is further provided on the rear side thereof with a plurality of conductive posts, and the bottom plate is provided on the front side thereof with a plurality of arc-shaped slotted holes. In the bottom plate, an end of the slotted hole is provided with a conductive elastic clip. When the conductive post is inserted into the slotted hole and moved to the end of the slotted hole, the conductive post is locked into the elastic clip.

According to a further preferred solution of the present invention, the middle plate is further provided on the rear side thereof with two conductive posts, and the bottom plate is provided therein correspondingly with two elastic clips. The two elastic clips are connected with a live wire and a zero wire, respectively. When the middle plate and the bottom plate are locked together, the conductive posts and the elastic clips come into full contact with each other, realizing power supply to a control panel within the middle plate.

According to a further another preferred solution of the present invention, the middle plate is further provided on the rear side thereof with three conductive posts, and the bottom plate is provided therein correspondingly with three elastic clips. The three elastic clips are connected with a live wire, a zero wire, and an earth wire, respectively. When the conductive posts and the elastic clips come into contact with each other, power supply to a control panel within the middle plate is realized.

According to a further preferred solution of the present invention, the bottom plate of the present invention is provided on the rear side thereof with an opening for a power supply wire to pass through, so as to realize power supply.

According to a further another preferred solution of the present invention, a head portion of the conductive post has a diameter greater than a diameter of a middle portion of the conductive post; and another end of the slotted hole has a diameter adapted to the diameter of the head portion of the conductive post, and the end of the slotted hole has a diameter the same as the diameter of the middle portion of the conductive post and smaller than the diameter of the head portion of the conductive post.

According to a further preferred solution of the present invention, two lamp caps and an induction camera are mounted on a front side of the middle plate. The lamp caps are connected to the middle plate in an adjustable way, and the induction camera is also connected to the middle plate in an adjustable way.

According to a further another preferred solution of the present invention, the lamp cap is connected to the middle plate through a connecting arm. An end of the connecting arm is inserted into the middle plate and is rotatable about a central shaft of the middle plate, and the end of the connecting arm is covered with a knob. Rotation of the knob allows the connecting arm to be locked to the middle plate.

According to a further preferred solution of the present invention, the connecting arm and the lamp cap are connected to each other by a locking bolt, and a connecting surface between the connecting arm and the lamp cap is a gear surface.

According to a further another preferred solution of the present invention, the induction camera is connected with the middle plate through a ball joint and is movable relative to the middle plate.

According to a further preferred solution of the present invention, the induction camera includes an induction element and a camera that are vertically stacked together. The camera is connected with the induction element through a vertically disposed shaft. The camera is rotatable circularly in a horizontal plane.

Compared with the existing technologies, the present invention has the following advantages. First, a bottom plate to be installed to a wall and a middle plate with a lamp cap mounted thereon are provided, and a connection between the middle plate and the bottom plate is a detachable connection. That is to say, during installation of the present invention, the bottom plate can be installed to the wall first. The bottom plate is relatively small and light, and can be easily installed by a worker on an installation surface. Second, the bottom plate is provided on a front side thereof with a plurality of slots, and the middle plate is provided on a rear side thereof with buckles corresponding to respective ones of the slots. The connection between the middle plate and the bottom plate is a simple locking connection. The worker only needs to align the buckles with the slots and insert the buckles into the slots to complete the locking, which is easy and convenient. Third, the bottom plate is provided therein with a shift block connected with a locking piece, and by driving the shift block, the locking piece can be moved and inserted into the slot to lock the buckle. After finishing the foregoing locking, the worker drives the shift block to lock the buckle into the slot, by way of which the installation is completed. The above installation can be done by a single worker alone and is easy and convenient. After the installation, connections between structures are hidden inside, which ensures an aesthetic appearance of the product.

BRIEF DESCRIPTION OF THE DRAWINGS

The present invention will be further described in detail below in conjunction with the accompanying drawings and preferred embodiments. However, those skilled in the art will appreciate that these drawings are drawn only for the purpose of explaining the preferred embodiments and therefore should not be interpreted as limiting the scope of the present invention. In addition, unless otherwise specified, the drawings are intended only to conceptually represent components or configuration of described objects and may contain exaggerated illustration. The drawings are not necessarily drawn to scale.

List of reference signs are specifically as follows:

1. bottom plate; 2. middle plate; 3. slot; 4. buckle; 5. locking piece; 6. shift block; 7. mounting piece; 8. central shaft; 9. adjustment shaft; 10. adjustment slot; 11. limit post; 12. limit hole; 13. screw; 14. conductive post; 15. slotted hole; 16. elastic clip; 17. lamp cap; 18. connecting arm; 19. knob; 20. locking bolt; 21. ball joint; 22. induction element; 23. camera.

DETAILED DESCRIPTION OF THE EMBODIMENTS

The present invention will be described in detail below in conjunction with the accompanying drawings.

In order to make the objectives, technical solutions, and advantages of the present invention clearer, the present invention is described further in detail below with reference to the accompanying drawings and embodiments. It should be appreciated that the specific embodiments described herein are only intended to explain rather than limit the present invention.

Figure 1:
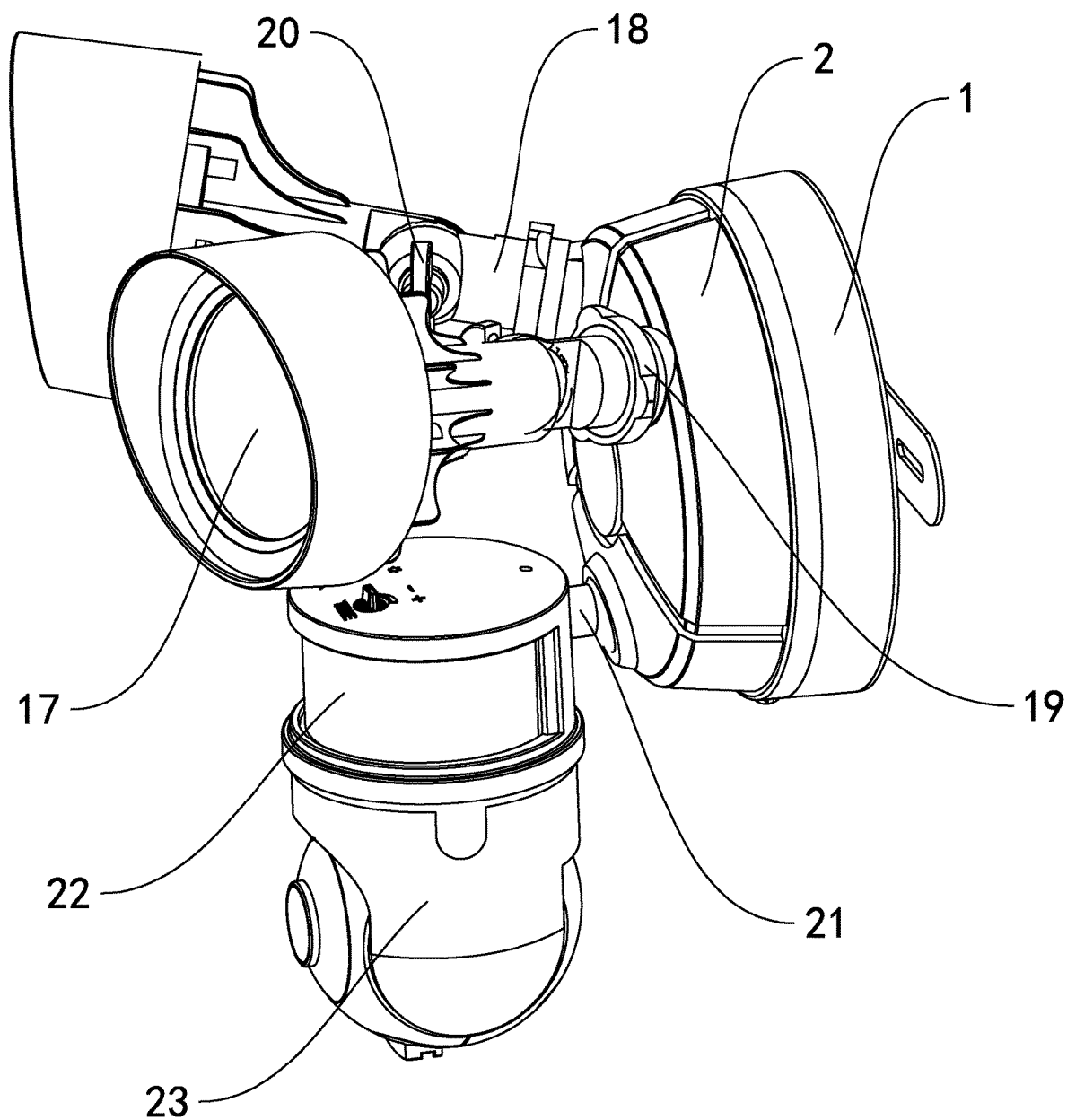
FIG. 1 is a schematic diagram showing a front structure of the present invention.
Figure 2:
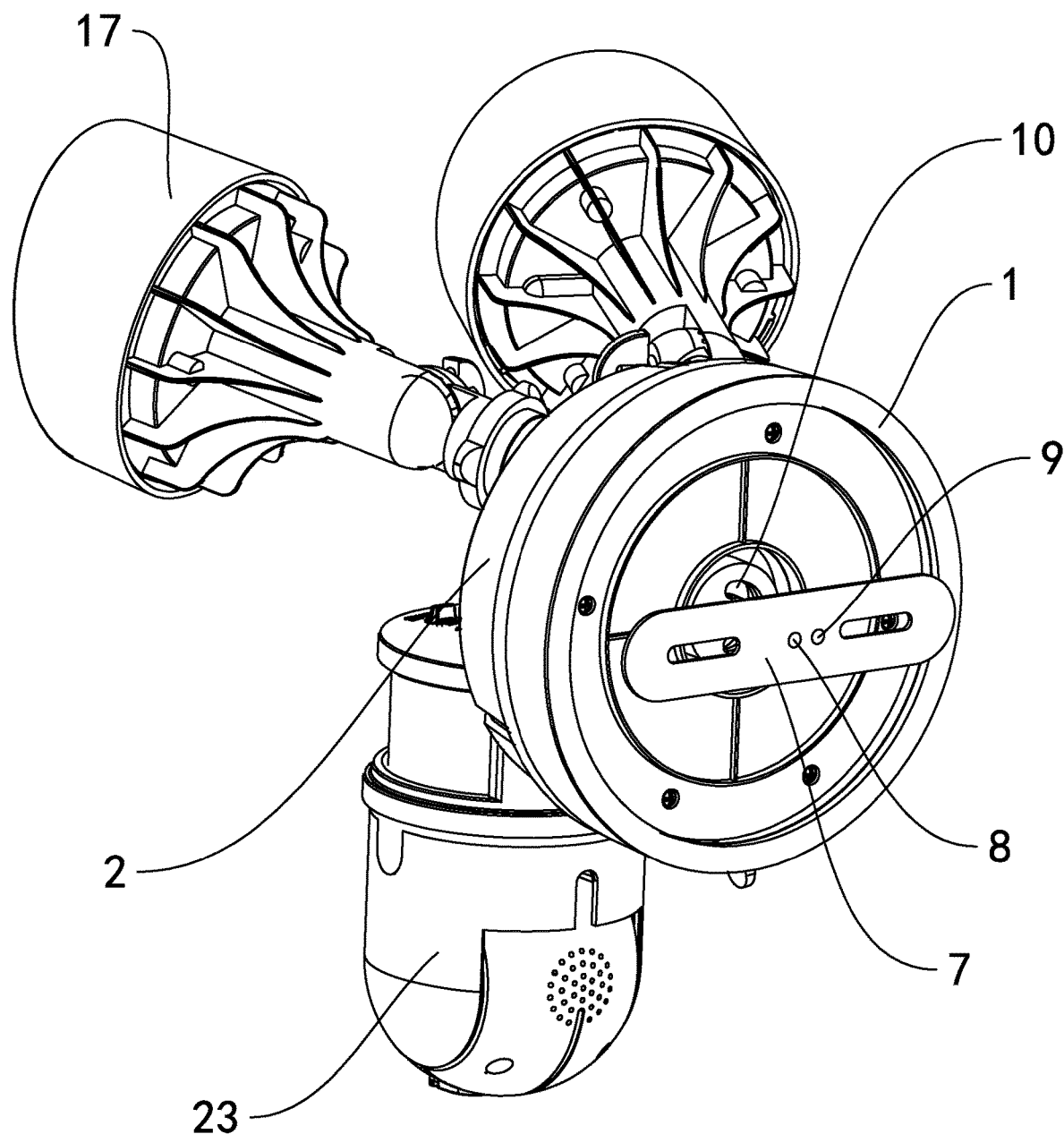
FIG. 2 is a schematic diagram showing a back structure of the present invention.
Figure 3:
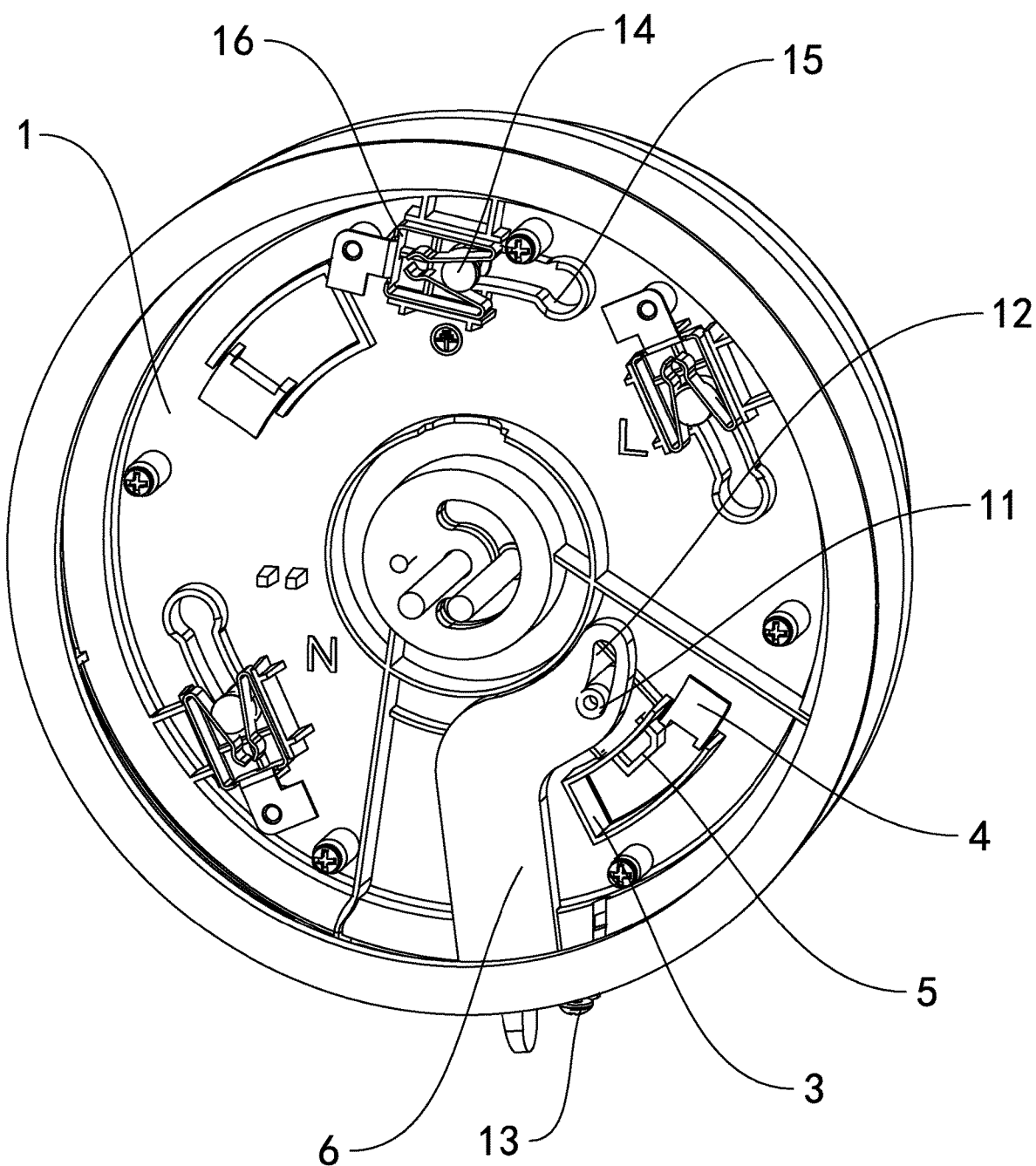
FIG. 3 is a schematic diagram showing structures of connections inside a middle plate.
Figure 4:
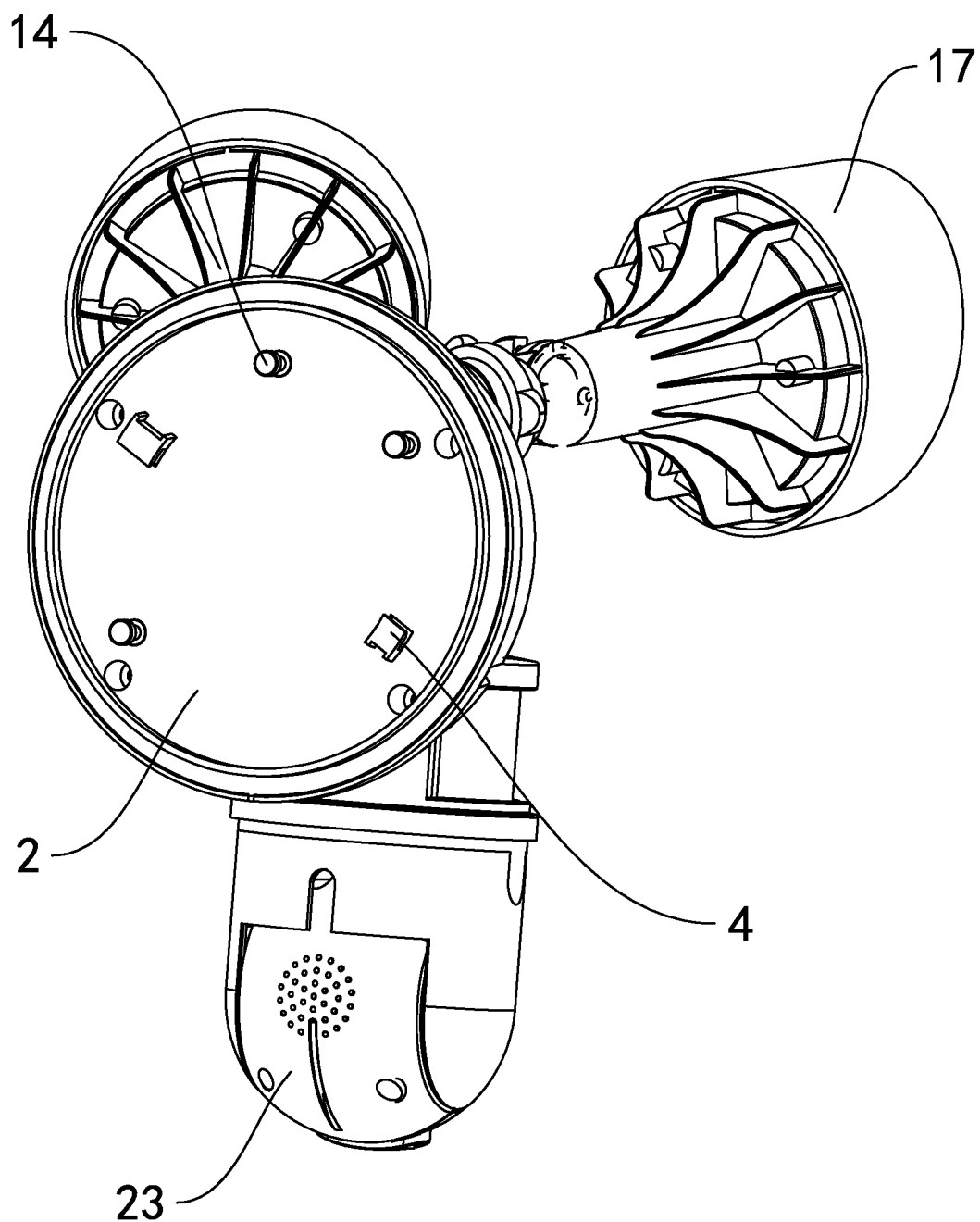
FIG. 4 is a schematic diagram showing a back structure of the middle plate.

As shown in FIGS. 1 to 4, an easy-to-install induction camera 23 lamp includes a bottom plate 1 to be installed to a wall, and a middle plate 2 on which a lamp cap 17 is mounted. The bottom plate 1 is provided on a front side thereof with a plurality of slots 3. The middle plate 2 is provided on a rear side thereof with buckles 4 corresponding to respective ones of the slots 3. The middle plate 2 is detachably connected with the bottom plate 1 through the buckles 4 and the slots 3. The bottom plate 1 is provided therein with a shift block 6 connected with a locking piece 5. By driving the shift block 6, the locking piece 5 may be moved to be inserted into the slot 3 to lock the buckle 4.

Further, the present invention may also be adapted to various installation environments. Behind the bottom plate 1, a strip-shaped mounting piece 7 is provided. The mounting piece 7 is to be fixed to a wall. The bottom plate 1 is provided at a center thereof with a central shaft 8 and an adjustment shaft 9. The bottom plate 1 is provided on a rear side thereof with a semi-circular arc-shaped adjustment slot 10. The adjustment shaft 9 is mounted in the adjustment slot 10 and is rotatable about the central shaft 8. The mounting piece 7 is connected with the bottom plate 1 through the central shaft 8 and the adjustment shaft 9. The present invention is installed through the strip-shaped mounting piece 7, and is different from a traditional lamp that uses a bottom surface thereof as an installation surface. The present invention is more suitable for use in different installation environments and can be installed on a relatively narrow wall.

When the central shaft 8 and the adjustment shaft 9 are in a state of not locking the mounting piece 7, the mounting piece 7 is rotatable by 180 degrees in response to a force applied thereon. When the central shaft 8 and the adjustment shaft 9 are in a state of locking the mounting piece 7, the mounting piece 7 is fixed to the bottom plate 1, and the bottom plate 1 is to be fixed to the wall through the mounting piece 7. The 180-degree rotation has fully satisfied an adjustable range for installing the present invention. Furthermore, the central shaft 8 and the adjustment shaft 9 of the present invention are provided at respective surfaces thereof with external threads. When the mounting piece 7 is adjusted to a proper angle, rotation of the central shaft 8 and the adjustment shaft 9 allows the mounting piece 7 to be locked and fixed, with the mounting piece 7 and the bottom plate 1 being fixed relative to each other.

The locking piece 5 is provided thereon with a limit post 11. An end of the shift block 6 is provided with a limit hole 12 sleeved outside the limit post 1. Another end of the shift block 6 extends out of the bottom plate 1 and is located on an outer circumference of the bottom plate 1. By driving said another end of the shift block 6, the locking piece 5 can be driven to move into or out of the slot 3. In order to ensure movement of the locking piece 5 along a predetermined trajectory when the shift block 6 is driven, the limit post 11 and the limit hole 12 cooperating with each other are provided in the present invention.

In order to further ensure stability of an entire structure of the present invention after the present invention is assembled, said another end of the shift block 6 can be fixed to a side wall of the bottom plate 1 by means of a screw 13.

The bottom plate 1 is provided on the front side thereof with a plurality of arc-shaped slots 3. The buckles 4 are L-shaped sheet structures. After being embedded into the slot 3, the buckle 4 may rotate for a certain distance so that the locking piece 5 can be inserted. The foregoing structure is a preferred structure of the present invention. In the present invention, the bottom plate 1 and the middle plate 2 are both disc-shaped structural members. Preferably, the middle plate 2 and the bottom plate 1 are fitted together by rotating.

In addition, the present invention adopts a detachable connection, and wiring of an internal circuit thereof is a problem. If there are wires connected between the two detachable structures (the middle plate 2 and bottom plate 1) (this is because components such as the lamp cap 17 are provided on the front side of the middle plate 2, and there is inevitably a power supply wire), then this is not a completely detachable structure. When installing the bottom plate 1, a worker still has to take the middle plate 2 into consideration.

In the present invention, the middle plate 2 is further provided on the rear side thereof with a plurality of conductive posts 14. Here, provided are usually two conductive posts 14 (connected to a live wire and a zero wire, respectively) or three conductive posts 14 (connected to a live wire, a zero wire, and an earth wire, respectively). The bottom plate 1 is provided on the front side thereof with a plurality of arc-shaped slotted holes 15. Specifically, the slotted holes 15 are provided in a one-to-one correspondence to the conductive posts 14. In the bottom plate 1, an end of the slotted hole 15 is provided with a conductive elastic clip 16. When the conductive post 14 is inserted into the slotted hole 15 and moved to the end of the slotted hole 15, the conductive post 14 is locked into the elastic clip 16. It should be noted that the elastic clip 16 is made of a conductive material, and power supply is introduced into the middle plate 2 through the elastic clip 16 and the conductive post 14. This realizes power supply to a control panel which will be provided in the middle plate 2.

Further, the bottom plate of the present invention is provided on the rear side thereof with an opening for the power supply wire to pass through, so as to realize power supply to the present invention from a mains supply.

Furthermore, the conductive post 14 of the present invention also plays a limiting effect in addition to the conductive function. A head portion of the conductive post 14 has a diameter greater than a diameter of a middle portion of the conductive post 14. Another end of the slotted hole 15 has a diameter adapted to the diameter of the head portion of the conductive post 14, and the end of the slotted hole 15 has a diameter that is the same as the diameter of the middle portion of the conductive post 14 and smaller than the diameter of the head portion of the conductive post 14. In other words, the conductive post 14 can be inserted from said another end of the slotted hole 15, but after the middle plate 2 is rotated and fitted, the conductive post 14 moves to the end of the slotted hole 15, in which case the conductive post 14 is limited in an axial direction by the slotted hole 15. At the same time, the conductive post 14 is embedded into the elastic clip 16 and is limited in a radial direction.

Two lamp caps 17 and an induction camera 23 are mounted on the front side of the middle plate 2. The lamp caps 17 are connected to the middle plate 2 in an adjustable way, and the induction camera 23 is also connected to the middle plate 2 in an adjustable way. This can realize a wide lighting range and make it possible to adjust the induction camera 23 to a best induction direction.

The lamp cap 17 is connected to the middle plate 2 through a connecting arm 18. An end of the connecting arm 18 is inserted into the middle plate 2 and is rotatable about the central shaft 8 of the middle plate 2, and another end of the connecting arm 18 is covered with a knob 19. Rotation of the knob 19 allows the connecting arm 18 to be locked to the middle plate 2. The connecting arm 18 and the lamp cap 17 are connected to each other by a locking bolt 20, and a connecting surface between the connecting arm 18 and the lamp cap 17 is a gear surface. At this point, the lamp cap 17 of the present invention is adjustable in a relatively large range, which can satisfy lighting in different environments.

The induction camera 23 is connected with the middle plate 2 through a ball joint 21 and is movable relative to the middle plate 2. The induction camera 23 includes an induction element 22 and a camera 23 that are stacked together vertically. The camera 23 is connected with the induction element 22 through a vertically disposed shaft. The camera 23 is rotatable circularly in a horizontal plane. At this point, the induction element 22 and the camera 23 of the present invention are adjustable in a relatively large range, which can meet induction angles and camera ranges required in different environments.

In the description of the present invention, it should be noted that orientation or positional relationships indicated by terms such as "center", "upper", "lower", "left", "right", "vertical", "horizontal", "inner", and "outer" are based on the orientation or positional relationships shown in the drawings, and are indicated only for conveniently describing the present invention and simplifying the description rather than indicating or implying that a device or element in question must be specifically orientated or configured and operated in a specific orientation, and therefore should not be interpreted as limiting the present invention. In addition, the terms "first", "second", and "third" are used only for descriptive purposes, and should not be interpreted as indicating or implying relative importance.

In the description of the present invention, it should be noted that unless otherwise clearly specified and defined, the terms "mount", "install", "connected", and "connect" should be interpreted in a broad sense. For example, the terms can mean a fixed connection, a detachable connection, or a one-piece connection; the terms can mean a mechanical connection or an electrical connection; and the terms can mean a direct connection, an indirect connection realized through an intermediate medium, or an internal communication between two components. Those of ordinary skill in the art can interpret specific meanings of the above-mentioned terms in the present invention depending on specific situations.

The present invention is described in detail above. Specific examples are used herein to illustrate principles and implementation of the present invention. The description of the above embodiments is only intended to facilitate understanding of the present invention and core concepts thereof. It should be noted that for those of ordinary skill in the art, various improvements and modifications can still be made to the present invention without departing from the principles of the present invention, and such improvements and modifications also fall within the protection scope defined by the claims of the present invention.

What is claimed is:

1. An easy-to-install induction camera lamp, comprising a bottom plate to be installed to a wall, and a middle plate with a lamp cap mounted thereon, wherein: the bottom plate is provided on a front side thereof with a plurality of slots; the middle plate is provided on a rear side thereof with buckles corresponding to respective ones of the slots; the middle plate is detachably connected with the bottom plate through the buckles and the slots; and the bottom plate is provided therein with a shift block connected with a locking piece, wherein driving of the shift block allows the locking piece to be moved and inserted into the slot to lock the buckle.

2. The easy-to-install induction camera lamp according to claim 1, wherein a strip-shaped mounting piece is provided behind the bottom plate, and the bottom plate is provided at a center thereof with a central shaft and an adjustment shaft and is provided on a rear side thereof with a semi-circular arc-shaped adjustment slot, wherein the adjustment shaft is mounted in the adjustment slot and is rotatable about the central shaft, and the mounting piece is connected with the bottom plate through the central shaft and the adjustment shaft.

3. The easy-to-install induction camera lamp according to claim 2, wherein: when the central shaft and the adjustment shaft are in a state of not locking the mounting piece, the mounting piece is rotatable by 180 degrees in response to a force applied thereon; and when the central shaft and the adjustment shaft are in a state of locking the mounting piece, the mounting piece is fixed to the bottom plate, and the bottom plate is to be fixed to the wall through the mounting piece.

4. The easy-to-install induction camera lamp according to claim 1, wherein: the locking piece is provided thereon with a limit post; and an end of the shift block is provided with a limit hole sleeved outside the limit post, and another end of the shift block extends out of the bottom plate and is located on an outer circumference of the bottom plate, wherein driving of the another end of the shift block allows the locking piece to be driven to move into or out of the slot.

5. The easy-to-install induction camera lamp according to claim 4, wherein the another end of the shift block is fixed to a side wall of the bottom plate by means of a screw.

6. The easy-to-install induction camera lamp according to claim 1, wherein the bottom plate is provided on the front side thereof with a plurality of arc-shaped slots, and the buckles are L-shaped sheet structures, wherein after being embedded into the slot, the buckle is rotatable for a distance so that insertion of the locking piece is achieved.

7. The easy-to-install induction camera lamp according to claim 1, wherein the middle plate is further provided on the rear side thereof with a plurality of conductive posts, and the bottom plate is provided on the front side thereof with a plurality of arc-shaped slotted holes, wherein in the bottom plate, an end of the slotted hole is provided with a conductive elastic clip, wherein when the conductive post is inserted into the slotted hole and moved to the end of the slotted hole, the conductive post is locked into the elastic clip.

8. The easy-to-install induction camera lamp according to claim 7, wherein a head portion of the conductive post has a diameter greater than a diameter of a middle portion of the conductive post; and another end of the slotted hole has a diameter adapted to the diameter of the head portion of the conductive post, and the end of the slotted hole has a diameter same as the diameter of the middle portion of the conductive post and smaller than the diameter of the head portion of the conductive post.

9. The easy-to-install induction camera lamp according to claim 1, wherein two lamp caps and an induction camera are mounted on a front side of the middle plate, wherein the lamp caps are connected to the middle plate in an adjustable way, and the induction camera is also connected to the middle plate in an adjustable way.

10. The easy-to-install induction camera lamp according to claim 9, wherein the lamp cap is connected to the middle plate through a connecting arm, wherein an end of the connecting arm is inserted into the middle plate and is rotatable about a central shaft of the middle plate, and the end of the connecting arm is covered with a knob, wherein rotation of the knob allows the connecting arm to be locked to the middle plate.

\* \* \* \* \*